United States Patent [19]

Schwartz et al.

[11] Patent Number: 5,270,364
[45] Date of Patent: Dec. 14, 1993

[54] CORROSION RESISTANT METALLIC FILLERS AND COMPOSITIONS CONTAINING SAME

[75] Inventors: Kenneth K. Schwartz, Boston; Michael T. Kocsik, Ashland, both of Mass.

[73] Assignee: Chomerics, Inc., Woburn, Mass.

[21] Appl. No.: 764,878

[22] Filed: Sep. 24, 1991

[51] Int. Cl.$^5$ .............. C08K 5/3472; C08K 3/08; C08L 63/00
[52] U.S. Cl. .................. 524/106; 524/401; 524/439; 524/440; 523/458; 523/459
[58] Field of Search .......... 524/440, 106, 439, 401; 523/458, 459

[56] References Cited

U.S. PATENT DOCUMENTS

| | | | |
|---|---|---|---|
| 3,318,728 | 5/1967 | Llyquist | 117/132 |
| 3,721,645 | 3/1973 | Zemlin | 524/106 |
| 4,657,785 | 4/1987 | Kelley et al. | 427/255.6 |
| 4,705,647 | 11/1987 | Yamaguchi et al. | 524/106 |
| 4,776,979 | 10/1988 | Kageyama | 524/440 |
| 4,921,623 | 5/1990 | Yamaguchi et al. | 252/512 |
| 4,963,291 | 10/1990 | Bercaw | 524/440 |
| 5,061,566 | 10/1991 | Morgan | 428/423.1 |

FOREIGN PATENT DOCUMENTS

| | | |
|---|---|---|
| 0090432 | 10/1983 | European Pat. Off. |
| 0339258 | 11/1989 | European Pat. Off. |
| 164262 | 12/1980 | Japan |
| 127366 | 7/1985 | Japan |
| 2171410 | 8/1986 | United Kingdom |

*Primary Examiner*—Paul R. Michl
*Assistant Examiner*—Tae H. Yoon
*Attorney, Agent, or Firm*—John Dana Hubbard; William L. Baker

[57] ABSTRACT

Metallic fillers are provided which are stabilized against corrosion. The metallic fillers are stabilized by treating the surface of the filler particles wtih a triazole, preferably an aromatic triazole. This may be accomplished either by pretreating the filler with a solution of the triazole, or by adding the triazole to a polymeric composition containing a metallic filler.

Polymeric compositions are further provided, e.g. compositions for microwave absorption, comprising a polymeric binder, a metallic filler and a triazole.

12 Claims, No Drawings

CORROSION RESISTANT METALLIC FILLERS AND COMPOSITIONS CONTAINING SAME

BACKGROUND OF THE INVENTION

The present invention relates to corrosion resistant, electrically non-conductive, ferromagnetic metallic fillers, wherein the metallic filler is protected by treatment of its surface with a triazole, and to compositions containing same. More particularly, the invention relates to polymeric compositions, containing a corrosion resistant filler, which are suitable for use as microwave absorbing materials.

Polymeric compositions containing ferromagnetic metallic fillers are frequently used as materials for microwave absorbing. Such compositions are used, for example, as coatings, gaskets, molded or extruded articles and sheet materials. Various ferromagnetic materials are known, but typically carbonyl iron is preferred, due to its relatively low cost and commercial availability.

Articles, e.g. coatings and gaskets, formed from such compositions are frequently used in harsh environments, in which the metallic filler at or near the surface of the article is subject to corrosion. This causes formation of an oxide layer on the surface of the article which may deleteriously affect the electromagnetic or other properties of the article. Additionally, the oxide layer (e.g. rust) is unsightly and unacceptable to the user. Iron, in particular, is extremely susceptible to rusting.

One approach to this problem has been the use of metal alloys, e.g. iron silicide, as metallic fillers. While these fillers provide improved corrosion resistance, they are significantly more expensive than conventional fillers and typically have inferior electrical properties.

Thus, it has been desired in the microwave absorbing field to provide polymeric compositions which would not be susceptible to corrosion, even under extreme environmental conditions.

SUMMARY OF THE INVENTION

The present invention provides electrically non-conductive, ferromagnetic metallic fillers which are stabilized against corrosion, and polymeric compositions containing such fillers. The metallic fillers of the invention are stabilized by treating the surface of the filler particles with a triazole, preferably an aromatic triazole. This may be accomplished either by pretreating the filler with a solution of the triazole, or by adding the triazole to a polymeric composition containing a metallic filler. It is believed that in the latter case the triazole attaches to the surface of the metal particles in situ.

Thus, the present invention relates to a polymeric composition for microwave absorption, comprising a polymeric binder, a metallic filler and a triazole. In its method aspects, the invention relates to a method of rendering corrosion resistant a polymeric composition containing a metallic filler, comprising the step of adding a triazole thereto, or, alternatively, pre-treating the metallic filler with a triazole, prior to incorporating the filler into the polymeric binder.

DETAILED DESCRIPTION OF THE INVENTION

The term "stabilized metallic filler", as used herein, refers to any electrically non-conductive, ferromagnetic metallic filler which has been treated with an azole, preferably a triazole, and more preferably an aromatic triazole according to the invention.

The stabilized metallic fillers of the invention may be incorporated in any polymeric binder. The term "polymeric binder", as used herein, refers to a polymer resin and any curing agents and/or accelerators necessary to effect curing of the resin. Polymeric binders of the invention include, but are not limited to, polyurethanes, polyureas, epoxies, synthetic and natural rubbers, including silicones, and acrylics. Suitable polymeric binders may be either curable, e.g. thermosets, or thermoplastic polymers. Where the binder is curable, it may be a single or multi-component, e.g. two component, system, curable at room temperature, elevated temperatures, or moisture cured. Suitable rubbers include neoprene, nitrile rubber, thermoplastic rubber, butadienes and silicone rubbers; suitable polyurethanes include those composed of a polyester, polyether, or fluorinated polyol, reacted with monomeric, oligomeric or polymeric isocyanates including but not limited to 4,4'-diphenylmethane diisocyanate (MDI), toluene diisocyanate (TDI) and 4,4'-diisocyanatodicyclohexylmethane (HMDI). Urethane elastomers, e.g. peroxide cured urethane elastomers, may also be used. Suitable epoxies include bisphenol resins cured with, e.g., amines, anhydrides, mercaptans.

In one preferred embodiment, the polymeric binder is a peroxide curable polyurethane elastomer. Compositions comprising this binder and a stabilized metallic filler of the invention are advantageously used in microwave absorbing gaskets and sheets.

In another preferred embodiment, the polymeric binder is a two component polyurea comprising an MDI polyether prepolymer reacted with an oligomeric diamine. Compositions comprising this binder and a stabilized filler of the invention are particularly suitable as microwave absorbing coatings.

Metallic fillers which may advantageously be stabilized according to the invention are those non-conductive ferromagnetic fillers which are susceptible to corrosion. Such fillers include, but are not limited to iron, e.g. carbonyl iron, cobalt, ferrites and mixtures thereof. The preferred amount of metal filler will vary, depending upon the polymeric matrix and metal filler selected and the electromagnetic properties desired. Such amounts may be readily determined by those skilled in the art, and are approximately the same as the amounts used in conventional metal-filled compositions, which amounts are well known and readily available in the literature. Generally however, levels of from about 60 to 95 weight percent, based on the total weight of the polymeric binder, are preferred, with levels of from about 70 to 90 weight percent most preferred. These levels of addition apply to fillers having aspect ratios of less than about 5:1, e.g. powders and flakes. Higher aspect ratio fillers, such as fibers and whiskers may be added at much lower levels, preferably from about 10 to 40 weight percent based on the weight of the polymeric binder. Particle size and shape of the filler will also vary depending upon the desired properties of the composition. The fillers may be of any shape which is generally used in the manufacture of metal-filled materials, including spherical, flake, platelet, irregular or fibrous (e.g. chopped fibers or whiskers). The particle size may be within the range normally used in metal-filled materials. Preferably, the average particle size is from about 1.0 to 300 microns. For many applications, an average particle size of from about 0.1 to 10 microns is preferred.

Most azoles may be used to stabilize the metallic filler. Aromatic triazoles, imidazoles and thiazoles are preferred, with alkyl substituted aromatic triazoles, e.g. tolytriazole and butyl benzyl triazole, most preferred. In some polyurethane and epoxy binders, addition of the triazole tends to retard the cure of the binder. Retardation can be minimized by the use of COBRATEC® 205 butyl benzyl triazole, a proprietary azole material commercially available from PMC Specialties Group.

The metallic filler may be treated with the triazole in several ways. First, if desired, the metallic filler may be pretreated with the triazole, prior to incorporation into a polymeric composition. This is accomplished by contacting the filler with a solution of the triazole, and a polar solvent such as methyl ethyl ketone. Preferably, the triazole is added to a polymeric composition containing a metallic filler. In general, any conventional method of addition may be employed. In the case of two component polymer systems, it is preferred that the triazole be added to the filler containing component, so that it is blended more thoroughly with the metallic filler, and has more time to attach to the surface of the filler particles. However, if desired, it may be added to the non-filler containing component such that it will contact the filler when the two components are mixed prior to use. In the case of extremely high viscosity systems, e.g. rubbers, it is preferred that the triazole be milled into the polymeric composition so that a homogeneous blend may be obtained. In the case of low viscosity coatings, it is preferred that the coating be agitated continuously during application, so that the triazole does not separate from the mixture.

The level of triazole which is required to obtain effective corrosion resistance will depend upon the filler and polymeric binder selected. Generally, when easily corroded metallic fillers are used, the level of triazole required will be higher. Preferred levels of addition are from about 0.1 to 10 weight percent, based on the total weight of the filler; levels of from about 1 to 5 weight percent are most preferred.

A preferred composition of the invention comprises from about 10 to 30 weight percent of a two component polyurea, comprising an MDI based polyether prepolymer and an oligomeric diamine in a ratio of from about 2:1 to 0.5:1; from about 70 to 90 weight percent of carbonyl iron; and from about 0.5 to 2 weight percent of an aromatic triazole. (All weight percents based on the total weight of the three components).

In another embodiment, the composition of the invention comprises from about 10 to 30 weight percent of a polyurethane elastomer; from about 2 to 8 parts by weight dicumyl peroxide based on 100 parts resin; from about 70 to 95 weight percent of a carbonyl iron; and from about 0.5 to 2 weight percent of an aromatic triazole.

Additional additives, such as catalysts, anti-oxidants, plasticizers, thixotropes, pigments and the like, may be added to the compositions of the invention as desired, provided such additives do not deleteriously affect the corrosion resistance of the composition.

The compositions of the invention, depending on their individual formulations, may be used as coatings, formed into gaskets or sheets, or used in any other suitable application for metal-filled polymers, e.g. as paints, caulks and adhesives.

The above description and following examples are intended to be of illustrative and not limiting effect. Other variations and modifications may be practiced by those skilled in the art without departing from the spirit and scope of the invention.

EXAMPLE 1

A corrosion resistant carbonyl iron filled polyurethane coating of the invention was mixed according to the formulation of Table 1 (all percentages are by weight). The components of Part A, urethane grade methyl isobutyl ketone and polyurethane prepolymer resin (VIBRATHANE® B670 resin, commercially available from Uniroyal Chemical), were mixed by jar-rolling for about 5 minutes. Part B was mixed using a double planetary mixer, first mixing an oligomeric amine resin (POLAMINE® 1000 aminobenzoate, commercially available from Air Products and Chemicals) with carbonyl iron powder (GAF Type CIP-S-5641) for about 10 minutes under vacuum to achieve adequate dispersion of the powder in the resin. Following this, an aromatic triazole (COBRATEC® 205, available from PMC Specialties) was dissolved in methyl ethyl ketone, then added to the mixing vessel under vacuum. Part B was then mixed for an additional 5 minutes.

Parts A and B were then mixed together for 5 minutes, using a mix ratio of 12.4 parts by weight Part A to 100 parts by weight Part B, to form a homogeneous coating. The coating was then sprayed onto an aluminum panel using a Binks Model 630 spray gun. Constant agitation was provided to the mixed compound while spraying. A final coating thickness of 0.040" was achieved by applying 8 coats of about 0.005" each, allowing about 30 minutes between each coat. The finished coating was dried for 24 hours at ambient temperature, then cured for 24 hours at 200° F. Following curing, the coated samples were prepared for salt fog testing by partially sanding the surface of the coating with 200 grit sand paper to remove the surface layer of the coating.

The coating was then subjected to microwave attenuation testing and visual inspection before and after 500 hours of salt fog exposure.

Microwave attenuation was measured before and after salt fog exposure by subjecting 1.04 mm thick coatings to a swept frequency coaxial dielectric measurement at frequencies from 2 to 18 GHz. Coatings containing the triazole showed no significant decrease while the coatings not containing the triazole where so excessively corroded that post salt fog measurements were impossible (triazole treated coatings at 10 GHz had attenuation levels of 9.9 dB before salt fog exposure and 10.2 dB after such exposure. The non-triazole coating had a pre exposure attenuation of 10.3 dB. Post exposure measurement was not possible due to corrosion).

EXAMPLE 2

A corrosion resistant carbonyl iron filled polyurethane elastomeric sheet was produced using the formulation shown in Table 2. The formulation was compounded using a 12" laboratory rubber mill. The gum was charged to the mill, and allowed to roll approximately five minutes to soften. Carbonyl iron was then added gradually, using frequent cutting and blending to ensure a homogeneous mixture. After all the iron powder had been added, the triazole was charged to the mill and was allowed to blend in for five minutes, to allow it to migrate to the iron particles. Finally a crosslinker (dicumyl peroxide) was added.

Sheets of the green compounded stock were pulled off the mill at a thickness of 0.060".

A control composition was produced according to the above procedure and formulation, without the triazole.

Cured sheets of each composition were produced by placing each sheet between release fabric, sealing it in a vacuum bag against an aluminum plate, drawing a vacuum, and curing the sheet in an oven at 300° F. for 30 minutes.

The cured sheets were then bonded to 4" by 4" aluminum plates, and the exposed surfaces sanded. These samples were then exposed to salt fog, according to ASTM B-117. Following 1 week (168 hours exposure), the control samples were removed and visually inspected. More than 95% of the surface of these samples was covered with corrosion (rust). The samples containing the triazole were kept in the salt fog chamber for a total of 1000 hours. Visual inspection after 1000 hours showed no corrosion.

TABLE 1

| Part A: | Polyether-based MDI terminated prepolymer | 69.8% |
| --- | --- | --- |
| | Methyl Isobutyl Ketone | 30.2% |
| Part B: | Carbonyl Iron Powder | 79.5 |
| | Polytetramethyleneoxide-di-p-aminobenzoate | 9.6% |
| | Methyl ethyl ketone | 10.1% |
| | Aromatic Triazole | 0.8% |

Mix Ratio:
12.4 parts by weight Part A to 100 parts by weight Part B.

TABLE 2

| Polyurethane gumstock | (Uniroyal Vibrathane 5004) | 100 parts |
| --- | --- | --- |
| Carbonyl iron powder | (GAF type CIP-S-5641) | 300 parts |
| Aromatic triazole | (Cobratec 205) | 3 parts |
| Dicumyl peroxide | (Hercules Di-cup 40KE) | 4 parts |

While the invention has been described with reference to its preferred embodiments, other embodiments can achieve the same result. Variations and modifications of the present invention will be obvious to those skilled in the art and it is intended to cover in the appended claims all such modifications and equivalents as fall within the true spirit and scope of this invention.

What is claimed is:
1. A polymeric composition consisting essentially of:
   a. a polymeric binder;
   b. an electrically non-conductive ferromagnetic filler selected from the group consisting of carbonyl iron, ferrites and mixtures thereof; and
   c. tolyltriazole.
2. A polymeric composition comprising:
   a) from about 5 to 30 weight percent of a two component polyurethane, comprising an MDI based polyether prepolymer and an oligomeric diamine;
   b) from about 70 to 95 weight percent of electrically nonconductive carbonyl iron; and
   c) from about 0.5 to 5 weight percent of an aromatic triazole; wherein all weight percentages are based on the total weight of a), b) and c).
3. A composition of claim 2 wherein the weight ratio of the polyether prepolymer to the oligomeric diamine is from about 2:1 to 0.5:1.
4. A polymeric composition consisting essentially of a polymeric binder of polyurethane, an electrically nonconductive carbonyl iron filler and an aromatic triazole selected from the group consisting of tolyltriazole and butyl benzyl triazole.
5. A polymeric composition consisting essentially of a polyurethane elastomer, present in an amount of from about 5 to 30 weight percent, an electrically non-conductive metallic filler selected from the group consisting of carbonyl iron, ferrites and mixtures thereof, present in an amount of from about 70 to 95 weight percent, and an aromatic triazole present in an amount of from about 0.5 to 10 weight percent.
6. A method of rendering a polymeric composition corrosion resistant, consisting essentially of the steps of:
   a) providing an electrically non-conductive carbonyl iron filler which comprises particles which each have an outer surface;
   b) contacting at least a portion of the outer surfaces of the particles with a aromatic triazole; and
   c) incorporating the treated filler particles in a polymeric matrix.
7. A method of claim 9 further comprising dissolving the triazole in a polar solvent prior to step b).
8. A method of claim 6 wherein the triazole is an aromatic triazole, and the polymer binder is selected from the group consisting of epoxies, polyureas, polyurethanes, acrylics and rubbers.
9. A method of claim 6 wherein the polymeric binder is present in an amount of from about 5 to 40 parts by weight, based on the total weight of a), b) and c).
10. A method of claim 6 wherein the metallic filler is present in an amount of from about 60 to about 95 weight percent, based on the total weight of the polymeric binder.
11. A method of claim 6 wherein the triazole is present in an amount of from about 0.1 to 10 weight percent, based on the total weight of the filler.
12. A method of producing a corrosion resistant polymeric composition consisting essentially of the steps of:
   a) providing a polymeric binder, an electrically non-conductive carbonyl iron filler and a aromatic triazole; and
   b) mixing the binder, filler and aromatic triazole to form a homogeneous composition.

* * * * *